3,077,501
PROPARGYL 2,2,2-TRIFLUOROETHYL ETHER

Billy D. Oakes, Tulsa, Okla., assignor to The Dow Chemical Company, Midland, Mich., a corporation of Delaware
No Drawing. Original application Aug. 24, 1959, Ser. No. 835,402, now Patent No. 3,030,311, dated Apr. 17, 1962. Divided and this application July 26, 1961, Ser. No. 126,888
2 Claims. (Cl. 260—614)

This invention relates to the new and novel compound propargyl 2,2,2-trifluoroethyl ether and to a method of its preparation.

The compound of this invention corresponds to the formula

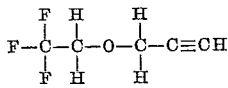

This compound has utility as a corrosion inhibitor for use in aqueous acids to inhibit the corrosion of ferrous based metals and nickel by such acids. By "aqueous acid" is meant any composition comprising a non-oxidizing acid and water and does not mean to exclude the presence of other substances.

Only a small amount of the compound is needed. As little as a few thousandths of 1 percent, based on the weight of the aqueous acid, significantly reduces the corrosion of iron, steel or nickel exposed to the acid. The degree of inhibition increases with the concentration of the inhibitor up to a level of about 1 percent. Beyond this point little added protection of the metal is obtained by the use of more inhibitor. Generally, it is preferred to use the inhibitor at a level of about 0.1 to 0.4 percent, this amount being adequate for most purposes.

The compound of the invention is effective as an inhibitor not only at ordinary temperatures but also at elevated temperatures up to the decomposition point of the compound and is particularly useful at temperatures up to 150° F. or more. Moreover, it is effective in various concentrations of acids, even including hydrochloric acid up to 37 percent, that is, commercial concentrated acid.

Applications in which the inhibitor is particularly useful include metal-pickling, cleaning and polishing baths, oil well-acidizing solutions, boiler-cleaning compositions and the like.

The compound of this invention is made from commerically available intermediates and is prepared as shown in the following example.

Example I

To 125 milliliters of substantially dry 1,4-dioxane in a 500 ml. flask was added 25 grams of 2,2,2-trifluoroethanol. Metallic sodium (6 grams) was added slowly to this solution to make sodium trifluoroethoxide. Propargyl bromide (30 grams) then was slowly stirred into the mixture, from which a precipitate of sodium bromide separated. The above listed steps all were carried out at about room temperature (20–25° C. The resulting mixture was poured into 200 milliliters water, whereupon the sodium bromide dissolved and from which two liquid layers separated, the bottom organic layer being removed from the mix by a separatory funnel. The so-separated organic layer, after drying over anhydrous calcium chloride was distilled at atmospheric pressure, the fraction boiling at 95–97° centigrade at 747 millimeters mercury absolute pressure giving an infra-red pattern compatible with that expected for propargyl-2,2,2-trifluoroethyl ether. The refractive index of this compound was measured as 1.3818 at 20° centigrade.

In order to demonstrate the effectiveness of the compound as a corrosion inhibitor, a test was run in which 0.4 percent of the propargyl 2,2,2-trifluoroethyl ether was put into a 10 percent aqueous solution of hydrochloric acid (150 ml.) held at 150° F. and a coupon (2.75 in. x 1.0 in. x 0.12 in.) of AISI 1010 mild steel was suspended in the solution for 16 hours. Thereafter the coupon was cleaned, dried and weighed to determine the amount of metal dissolved. Table I shows the results of the test as compared with that obtained for a similar panel tested in non-inhibited 10 percent aqueous solution of hydrochloric acid at the same temperature.

Table I

[Corrosion of AISI 1010 mild steel by 10 percent HCl in the presence o 0.4 percent of propargyl 2,2,2-trifluoroethyl ether

| Example No. | Corrosion Rate, lbs./sq. ft./day |
|---|---|
| 1 (test) | 0.0011 |
| 2 (control-no inhibitor) | >1 |

This application is a division of copending application Serial No. 835,402, filed August 24, 1959, now Patent No. 3,030,311.

I claim:
1. Propargyl 2,2,2-trifluoroethyl ether.
2. A process for the preparation of propargyl-2,2,2-trifluoroethyl ether which comprises; contacting, at about 20–25° C. essentially equimolar quantities of metallic sodium and propargyl bromide with a solution of 2,2,2-trifluoroethanol, adding the so-produced resulting mixture to an excess of water, removing the resulting insoluble organic layer from said reaction mixture, and separating propargyl 2,2,2-trifluoroethyl ether therefrom.

No references cited.